F. C. RINSCHE.
ADDING MACHINE.
APPLICATION FILED DEC. 23, 1907.

1,049,921.

Patented Jan. 7, 1913.

Witnesses:
Carl Clayford
John Enders

Inventor:
Frank C. Rinsche,
By Sheridan & Wilkinson
Attys.

F. C. RINSCHE.
ADDING MACHINE.
APPLICATION FILED DEC. 23, 1907.

1,049,921.

Patented Jan. 7, 1913.
9 SHEETS—SHEET 2.

Witnesses:
C. S. Gaylord,
John Enders.

Inventor:
Frank C. Rinsche,
By Sheridan & Wilkinson
Attys.

F. C. RINSCHE.
ADDING MACHINE.
APPLICATION FILED DEC. 23, 1907.

1,049,921.

Patented Jan. 7, 1913.

Witnesses:

Inventor:
Frank C. Rinsche,
By Sheridan & Wilkinson
Attys.

UNITED STATES PATENT OFFICE.

FRANK C. RINSCHE, OF ST. LOUIS, MISSOURI.

ADDING-MACHINE.

1,049,921.   Specification of Letters Patent.   Patented Jan. 7, 1913.

Application filed December 23, 1907. Serial No. 407,718.

*To all whom it may concern:*

Be it known that I, FRANK C. RINSCHE, a citizen of the United States, residing at St. Louis, State of Missouri, have invented certain new and useful Improvements in Adding-Machines, of which the following is a specification.

In adding machines which print the several items to be added it is common to provide individual keys for each of the digits from 1 to 9, but no key for zero. In such machines it is common to provide automatic means for printing zeros to the right of significant digits. To illustrate, if the item "400.00" is to be printed, it is only necessary to press the "4" key and then the zeros to the right will print automatically when 4 is printed. An improvement in machines of this class consists in "splitting" the printing mechanism, so that two numbers can be printed simultaneously side by side without having zeros filled in between them. A further improvement in machines of this class consists in making them of the "variable split" type. In such machines the point at which the printing mechanism may be "split" is capable of being shifted by the operator so that large numbers can be printed on the right and small numbers on the left, or the capacity of the machine can be changed by means of the "variable split" mechanism so that larger numbers may be printed on the left and smaller numbers on the right.

One of the objects of my invention is to make an improvement in adding machines of the split type.

This improvement consists in so arranging the machine that the items printed on the right go into the accumulator while the items printed on the left do not,—but the total of the items on the right may, by carrying from denominations of lower order, extend over into the mechanism corresponding to the items on the left, and the total may be printed with its digits of higher order extending over to the left.

Another object of my invention is to provide means whereby an item may be printed in a distinctive color without letting it enter the accumulator.

It is a further object along this line to so arrange the mechanism for thus eliminating an item from the accumulator that it shall be actuated by the throw of the main operating handle rather than by the mere depression of the eliminating key.

Various other objects attained by my invention will be made apparent in the following specification and claims.

My invention is an improvement on the adding machine known as the "Universal" which is now on the market, and is made by the Universal Adding Machine Company of St. Louis, Missouri, and exemplified in my prior Patents, Nos. 654,181, issued July 24, 1900, 726,803, issued April 28, 1903, and 751,207, issued February 2, 1904.

Referring to the drawings

Figure 1:
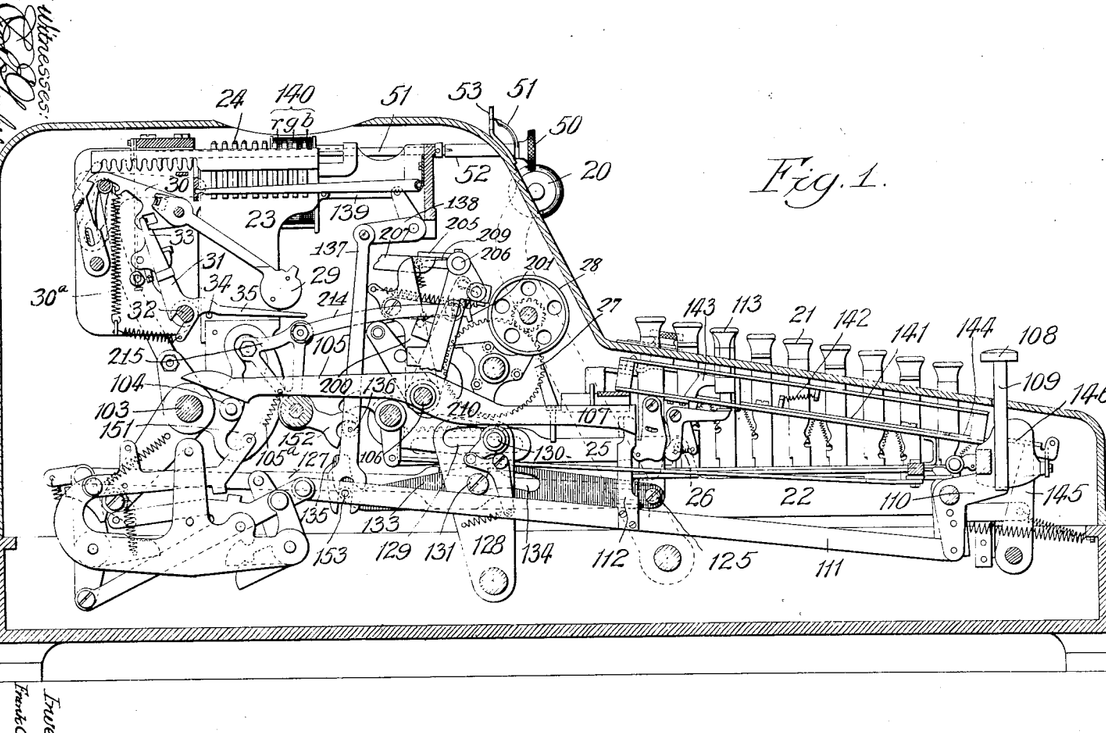
—Figure 1 is a side elevation of my improved adding machine, the casing being shown in section, in order to disclose the mechanism within.
Figure 2:
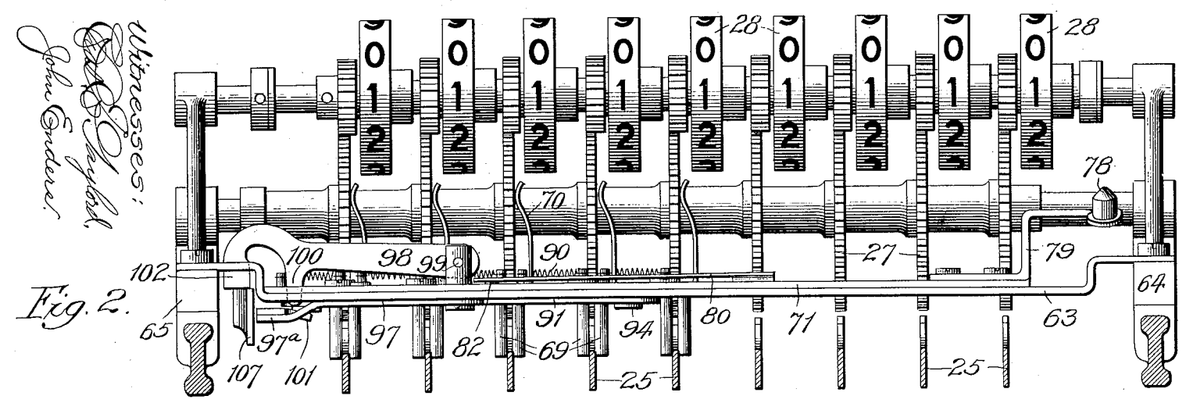
Fig. 2 is a front elevation of the accumulating mechanism.
Figure 3:
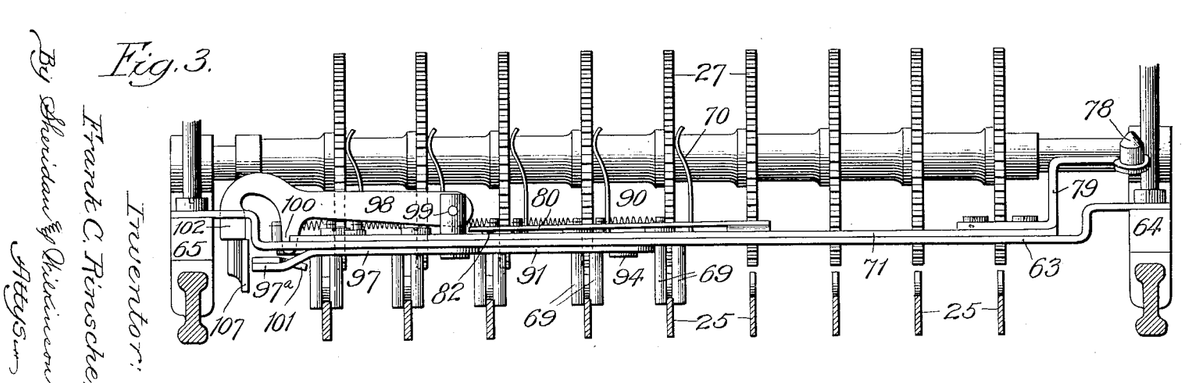
Fig. 3 is a view similar to Fig. 2, showing the parts in a different position.
Figure 4:
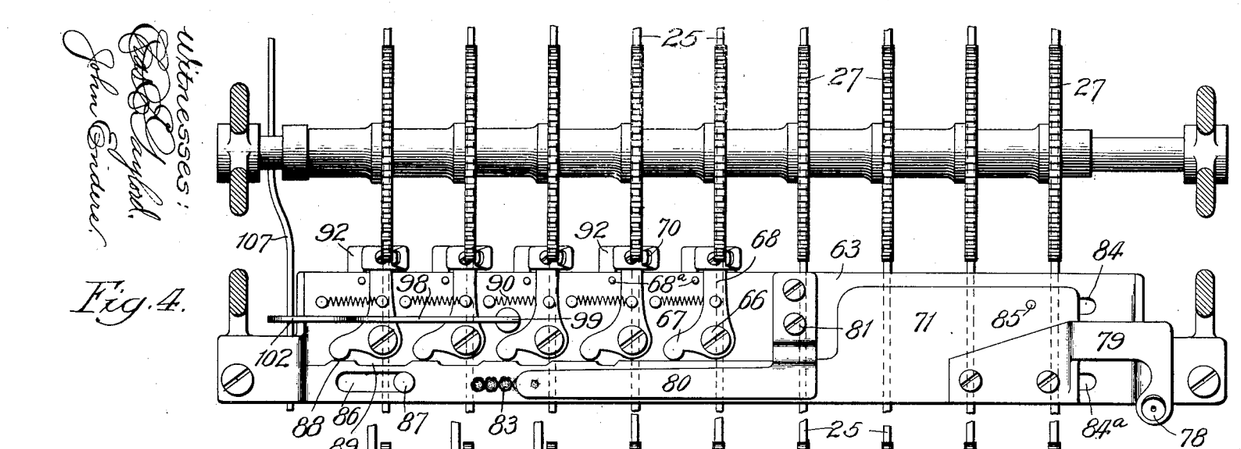
Fig. 4 is a top plan view of the accumulating mechanism corresponding to Fig. 2.
Figure 5:
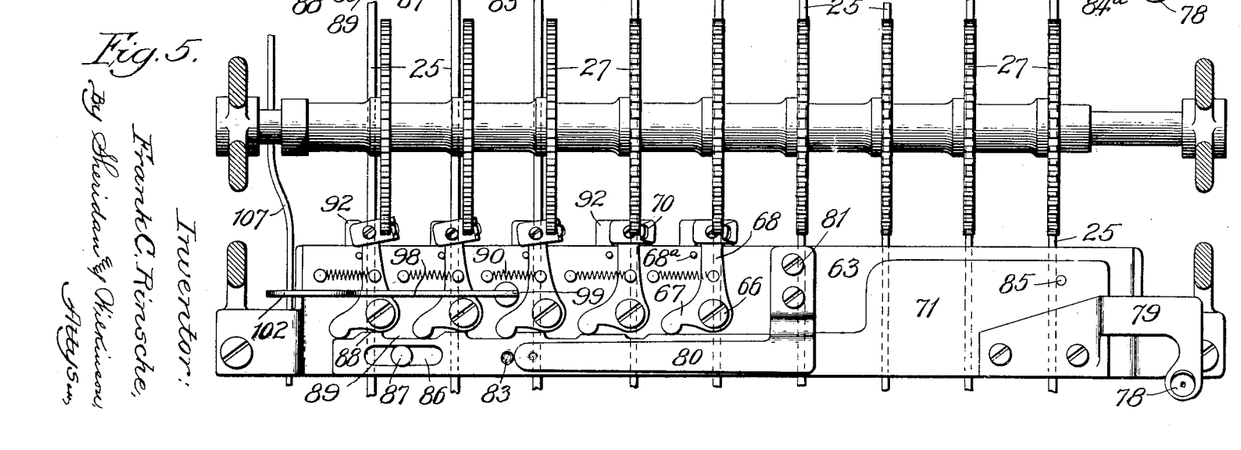
Fig. 5 is a top plan view corresponding to Fig. 3.

Referring to Fig. 1, the part to the right is called the front of the machine and directions to the right are forward. This adding machine has keys 21 arranged in columns, there being nine keys, respectively designated as 1 to 9, in each column. One such column is seen in Fig. 1. Each column corresponds to a certain order of digits, that is, there is a column for units, a column for tens, &c. For each column of keys there is a sliding bar 22 extending from the front to the rear and having an upright 23 at its rear end, carrying type 24. As shown in Fig. 1, the forward type is in position for printing, and this is a zero. Rack bars 25 are pivoted at 26 to the respective sliding bars 22. The extent of forward movement of each sliding bar is determined by the depression of the key 21. This displacement is occasioned by the forward throw of the operating handle 20 which brings the appropriate type 24 in position for printing, and also by engagement of the rack 25 with the gear wheel 27 adds the corresponding amount into the accumulator 28. In printing, the type 24 are struck by hammers 29. Each hammer is on the same shaft with an operating arm 30 and the two are united so that there is only a very slight relative motion between them. There is a spring $30^a$ for each hammer, and in the operation of the machine the hammer is held back from the type against the tension of the spring $30^a$ by the trigger 31 mounted to rotate on the shaft 32 and having a shoulder 33 which co-acts with a lug on the hammer operating arm 30. If the trigger remains in the position shown in Fig. 1, the hammer will not be released and the type 24 in the corresponding sliding bar 22—23 will not print. The sliding bar 22—23 carries a stud 34 which fits into a notch 36 (see Fig. 14) in the trigger 31.

Figures 13, 14, 15:
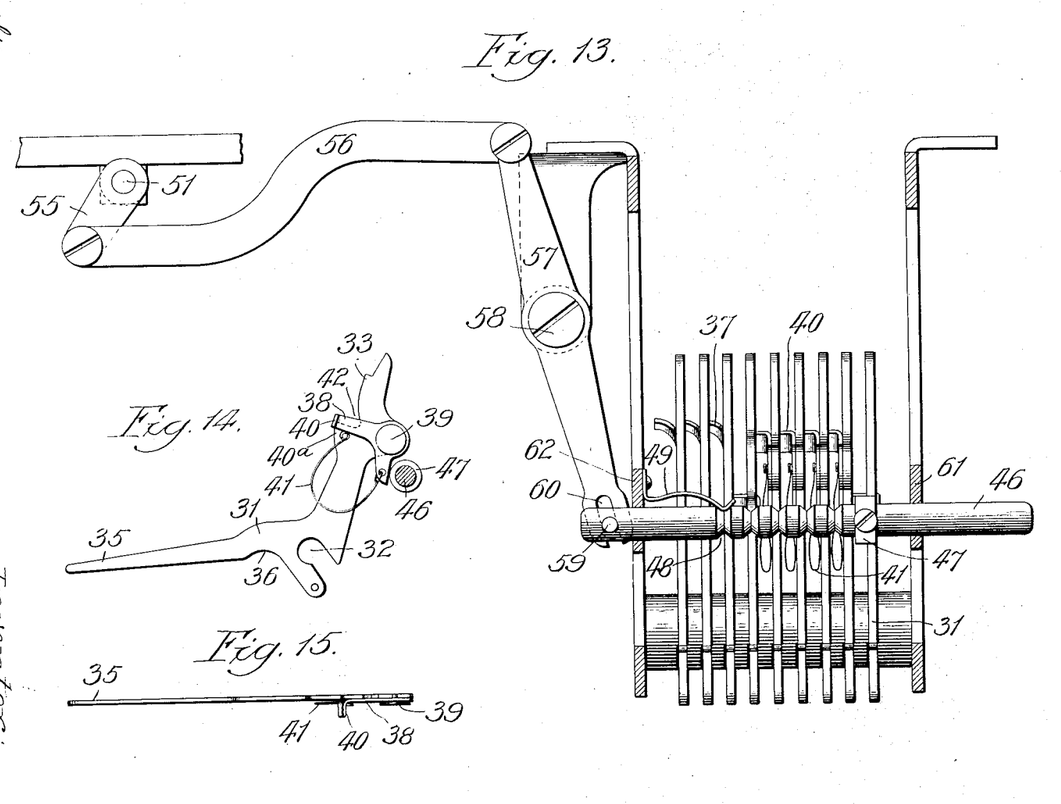
Fig. 13 is a rear elevation of part of the printing mechanism showing the variable splitting device.
Fig. 14 is a side elevation of one of the triggers for holding and releasing the printing hammers.
Fig. 15 is a top plan view thereof.
Figures 16, 17, 18:
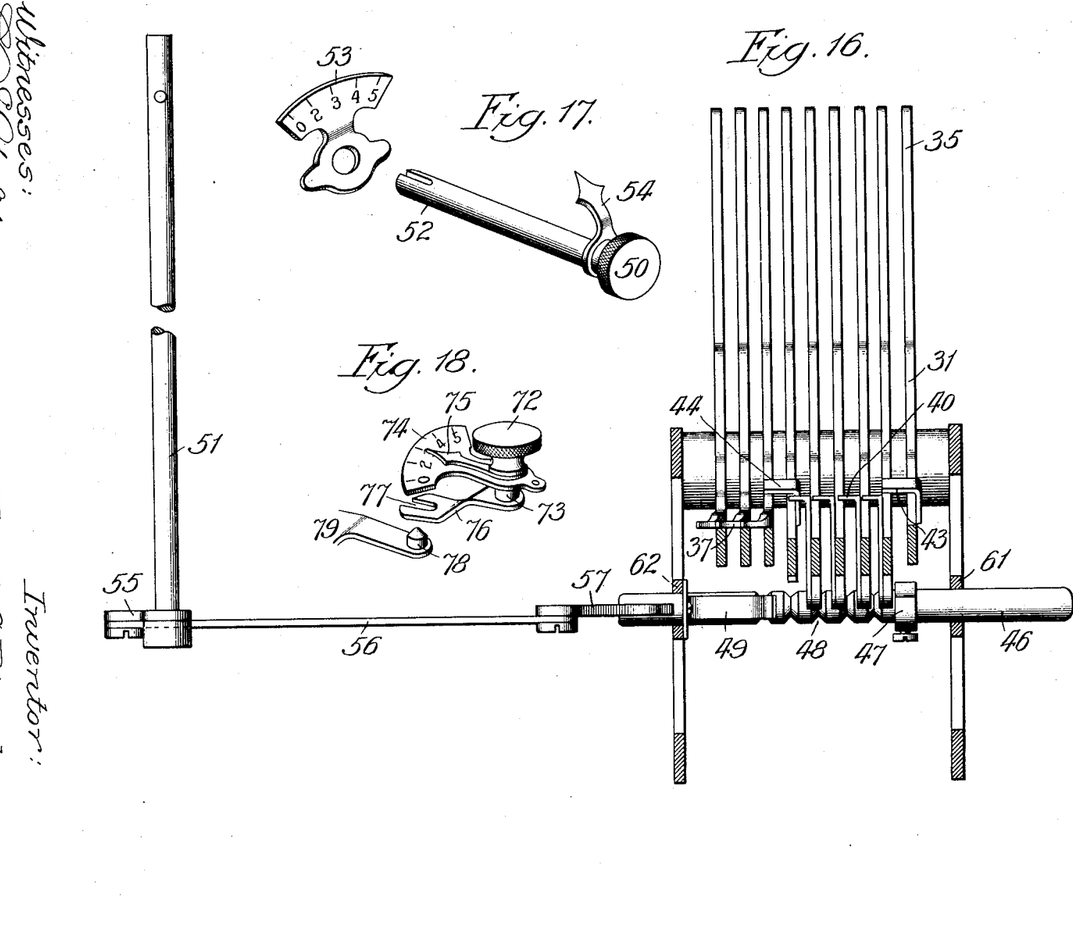
Fig. 16 is a top plan view of the parts shown in Fig. 13.
Fig. 17 is a perspective view of the means by which the variable splitting device is adjusted.
Fig. 18 is a perspective view of the means by which the accumulating mechanism is disconnected to correspond to the adjustment of the variable splitting device.

On referring to Fig. 1, it will be seen that if the sliding bar 22—23 is moved forward, the stud 34 will pass under the arm 35 and will raise the trigger. Thus it will be seen that with the parts in Fig. 1, when the sliding bar 22—23 is at zero position, there will be no printing. However, each of the right-hand triggers (three in the present instance) carries a lug 37 that projects across in front of the next trigger to the right thereof, as shown in Figs. 13 and 16. Thus if any one of the sliding bars 22—23, corresponding to such triggers, be drawn forward, and the corresponding hammer is released by the trigger, all the hammers to the right will also be released, because the lifting of one trigger will lift those to the right by reason of the lugs 37. In the machine as it has been manufactured and sold, the lugs 37 as a series extended clear across, that is, the triggers were all alike.

In the machine here disclosed, a plurality of intermediate triggers 31 have movable lugs or couplers so that the machine can be split at different points. Fig. 14 illustrates one of these modified triggers. The bell crank 38 is pivoted thereon at 39 and has a lateral projection 40 at its end which extends across in front of the shoulder $40^a$ on the neighboring trigger to the right. The bell crank 38 is held in the position shown in Fig. 14 by the spring 41. Just above the shoulder 40 is a deep notch 42. With the parts in the position shown in Fig. 14, it will be seen that the rotation of the trigger 31 in the clockwise direction about its axis 32 will cause the projection 40 to catch the shoulder $40^a$ of the neighboring trigger to the right and cause it to rotate likewise. However, if the bell crank 38 were raised, then on rotation of the trigger 31 as described, the projection 40 would enter the notch in the neighboring trigger to the right and the latter would, therefore remain at rest.

Inasmuch as it is seldom desirable to split off a single digit on the extreme left of the machine, the laterally projecting lug 43 is provided on the left-hand trigger 31, so that the said trigger always necessarily lifts the neighboring trigger to the right. A similar lateral projection 44 extends from one trigger to the next where the transition occurs from one kind of trigger to the other (see Fig. 16). The two projections 43 and 44 are the same in function as the projections 37.

A reciprocating shaft 46 is mounted so as to slide laterally in the frame members 61 and 62. This shaft carries a collar 47 which lies just behind the depending arms of the bell cranks 38, as shown in Fig. 14. The shaft is notched, as indicated by the reference numeral 48, and a spring 49 is adapted to fit into any one of the notches. The beveling of the spring and the notches is such that the shaft 46 can be displaced laterally by the application of a moderate degree of force in spite of them, but they tend to hold the shaft in one of the several positions corresponding to the several notches.

Protruding from the casing toward the front of the machine is a milled head 50 by which the shaft 51 may be rotated through the detachable connection 52. There is a scale 53 on the casing, and a pointer 54 projecting from the milled head 50 registers the position of the shaft 51. A crank 55 at the rear end of said shaft is pivotally connected to a link 56 which has its other end pivoted to the rocking beam 57 mounted to rotate on the screw 58. A stud on the end of the shaft 46 is engaged by a jaw 60 at the extremity of the said rocking beam 57. Thus rotation of the milled head 50 by the thumb and finger of the operator shifts the reciprocating shaft 46, and the position of the collar 47 is indicated by the index hand 54. Whichever one of the depending arms of the little bell cranks 38 the collar 47 stands behind, will engage the collar when the corresponding trigger 31 is lifted. Thus the lateral projection 40 will be raised and will drop into the notch 42 of the neighboring trigger to the right and the machine will be split between these two triggers.

Referring more particularly to Figs. 2 to 5, inclusive, a plate 63 is mounted so as to extend across between the side frames 64 and 65. On the pivotal screws 66 there are mounted a number of little bell cranks each having arms 67 and 68. The rearward arms 68 extend over the edge of the plate 63 and each has a pair of studs 69 projecting downwardly therefrom on either side of the corresponding rack bar 25. A tongue 70 of spring metal stands up from each arm 68 and the extremity presses against the corresponding gear wheel 27 of the accumulator mechanism. The forward ends 67 of the bell crank 67—68 are drawn by the springs 90 against the edge of the plate 71, which by means of the studs 85—85$^a$ and 87 coacting with the slots 84—84$^a$ and 86, is adapted to slide laterally on the plate 63. On the casing at the right of the machine there is a milled head 72 on a shaft 73 which terminates in a crank 76 having a forked end 77. A pointer 75 on the milled head indicates on a scale 74 the position thereof. The fork 77 engages a stud 78 on the arm 79 which is rigidly attached to the aforesaid sliding plate 71, and thus the rotation of the milled head 72 shifts the sliding plate 71. A spring tongue 80 is attached to the fixed plate 63 by means of the screws 81 and at its end it has a beveled stud 82 adapted to engage one of the series of depressions 83 in the sliding bar 71. Thus the said bar 71 is held by the tongue 80 in any position, but its resistance is not great enough to prevent movement by means of the milled head 72. The rear edge of the sliding bar 71 has alternating projections 88 and notches 89, as clearly shown in Figs. 4 and 5. An inspection of these figures will show that as the said sliding bar is moved to the right the two bell crank arms 67 at the left will drop into the corresponding notches simultaneously. Thereafter, by further movement of the sliding bar to the right the arms 67 will successively drop into the corresponding notches. As each end 67 drops into the corresponding notch 89, the studs 69 swing the corresponding rack bar 25 to the left disengaging it from its respective gear 27. The pivotal connections between the rack bars 25 and the sliding bars 22—23 are made so as to permit this slight lateral play.

Figure 6:
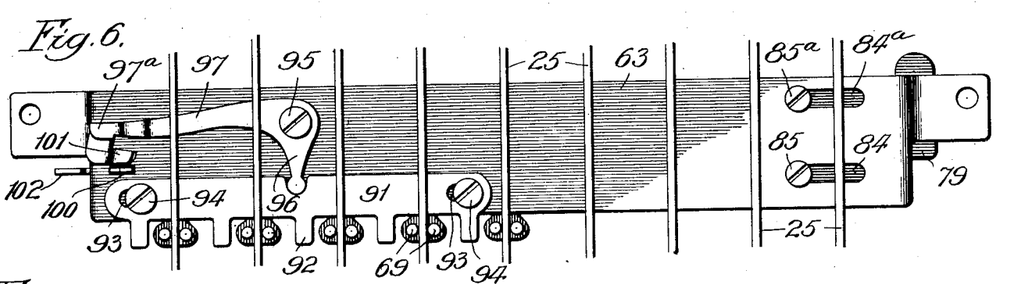
Figs. 6, 7 and 8 are bottom plan views of the parts shown in Figs. 4 and 5, showing certain movable parts in different relative positions.
Figure 7:
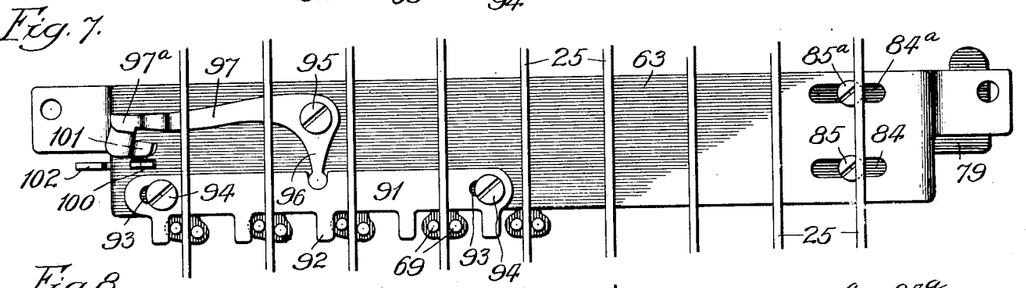
Figure 8:
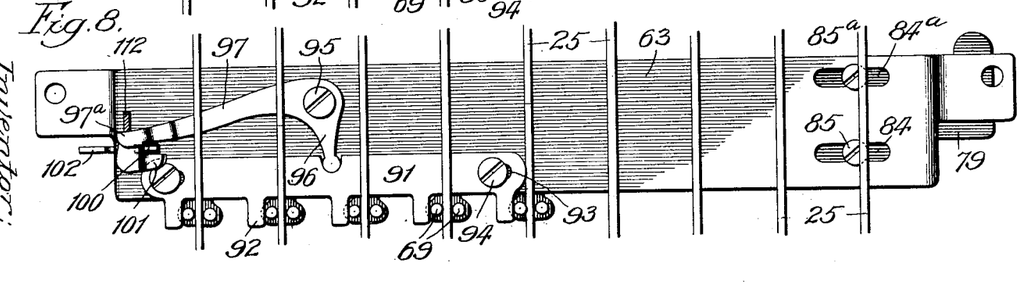

On the under side of the fixed plate 63, as shown in Figs. 6, 7 and 8, there is a slide 91 having rearward projections 92 alongside the depending studs 69. Screws 94 coacting with slots 93 serve to guide and limit the movement of the slide 91. On the screw 95, as an axis, there is mounted a bell crank 96—97, the end 96 engaging the slide 91 and the end 97 having a shoulder 97$^a$ and beyond this a tongue 101. On the upper side of the fixed plate 63 an arm 98 is pivoted at the point 99 and this has a tongue 100 adapted to drop through a hole in the plate 63 and engage the aforesaid tongue 101. The arm 98 also carries another depending tongue 102 beyond the tongue 100. The tongue 102 hangs over the end of the plate 63. It will be seen that when the bell crank 96—97 is moved to the position shown in Fig. 8, the projections 92 pushing against the depending studs 69 will push the rearward ends 68 of the bell crank 67—68 to the right and lift the forward ends 67 out of the corresponding notches 89. In the position shown in Fig. 8, the rack bars 25 will be pushed over by the depending studs 69 so as to engage the accumulator gears 27. If the tongue 102 were to be pushed in a direction away from the observer as viewed in Fig. 8, it is obvious that this would lift the tongue 100 away from the hook 101 and permit the springs 90 to shift the rack bars 25 to the left, in so far as the notches 89 are in position to receive the ends 67 of the bell cranks 67—68.

Referring to Fig. 1, the shaft 103 is so connected to the main operating handle 20 that when the latter is thrown over, the shaft 103 makes a partial rotation counter clockwise and then returns to the position shown. This movement raises the stud 104 and thus acting against the spring 105$^a$ raises the end 105 of the first class lever which is pivoted at 106 and whose opposite end is designated as 107. The end 107, when the operating handle is in its normal position, holds up the tongue 102 of the arm 98 and thus holds the tongue 100 out of the way of the hook 101. But during the operation of the said operating handle the end 107 drops down away from the tongue 102. At the forward end of the machine is the total key 108 on the stem 109. By means of the bell crank 110 a depression of said total key shifts the long link 111 to the left. This link 111 carries an upright 112 whose end stands directly in front of the shoulder 97$^a$. Thus when the total key is depressed the bell crank 96—97 is shifted until the hook 101 stands behind the tongue 100 ready to be engaged thereby if the said tongue 100 shall drop through the hole in the fixed plate 63. In taking a total the procedure is to first depress the total key 108, and then throw the main operating handle. By the depression of the said total key, the hook 101 is thrown over into the position to be caught by the depending tongue 100 and by the throw of the operating handle thereafter the lever end 107 drops from under the depending tongue 102 and thus permits the depending tongue 100 to engage the hook 101. On the return of the operating handle, the lever end 107 again lifts the locking arm 98 and by the release of the total key the upright 112 is withdrawn from the shoulder 97ª and the racks 25 are again shifted out of engagement with the accumulator gears 27, so far as permitted by the position of the notches 89.

Figure 19:
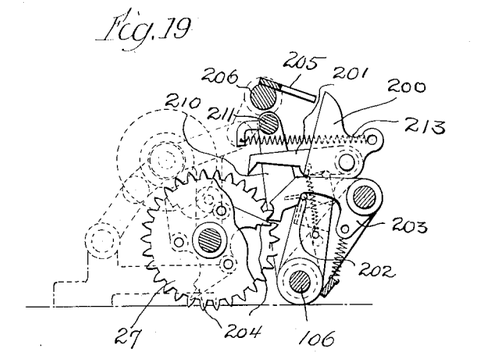
Figs. 19, 20 and 21 represent transfer or carrying mechanism under different conditions.
Figure 20:
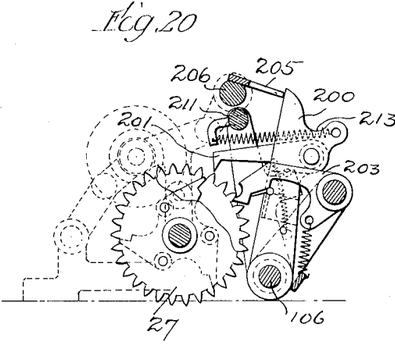
Figure 21:
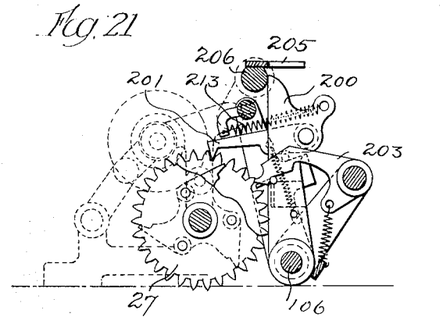
Figure 22:
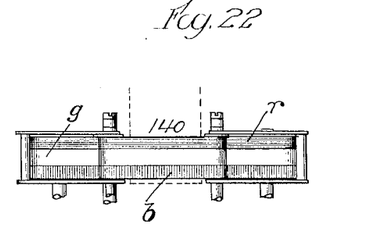
Fig. 22 represents an inking ribbon in top plan view.

Means whereby the adding gears 27 are caused to carry tens throughout the series may be of any suitable form and in the present instance I have illustrated and shall briefly describe the form of transfer or carrying mechanism disclosed in my aforesaid prior Patent No. 751,207. This comprises a series of upstanding arms or blades 200 pivoted loosely and independently of each other about the shaft 106 and carrying pivotally mounted upon them pawls 201 for imparting transfer movements to the gears 27. These arms or blades have pins 202 (Figs. 19 to 21) normally engaged with shoulders of detents or trip pawls 203, as shown in Fig. 19, said trip pawls extending for engagement with projections 204 on the gears 27. It will of course be understood that a trip pawl operated upon by projections of one gear 27 normally restrains an arm or blade 200 carrying a pawl 201 which acts upon the next higher gear 27. Upon the tripping of a pawl 203 the arm or blade 200 moves forward a slight distance striking against a comb plate 205. This comb plate is secured to a rock shaft 206 and is normally upheld by the forward end of a lever 207 which corresponds with the lever designated 81 in my said prior patent, see Fig. 1 in the present case. At the very beginning of an operation of the machine this lever is moved and a spring 208 applied to an arm 209 of said rock shaft (see Fig. 1) pulls the comb plate down so that it will obstruct any tripped transfer arms or blades 200, (see Fig. 20). Of course it follows that at the very conclusion of an operation of the machine said lever lifts the comb plate releasing any such transfer arms or blades whereupon they move further forward and cause their pawls 201 to turn the higher gear wheels 27 (Fig. 21). A restoring bail is employed as usual to retract any transfer arms which have so acted. Such bail is here shown as comprising side arms 210 connected by a cross rod 211 and secured to the rock shaft 106. As the operating handle is drawn forward this bail is rocked rearward, re-setting any transfer arms which may have been tripped in the previous operation. Then as the handle returns the bail is rocked forward. It is shown forward or in its normal position in Figs. 19 and 20 and springs 213 are shown connecting the bail with the transfer arms, said springs serving to swing the arms forward when they have been released from the restraint of the trip pawls 203 and further forward when the comb plate 205 lifts. The bail is as usual rocked back and forth through the medium of a link 214 (Fig. 1), which link is connected to a cam-operated lever. The latter is here shown as having a triangular portion 215 to which said link is connected and which carries a roller engaged with a cam slot 151 in a sector 217 secured to the rock shaft 103.

Figure 9:
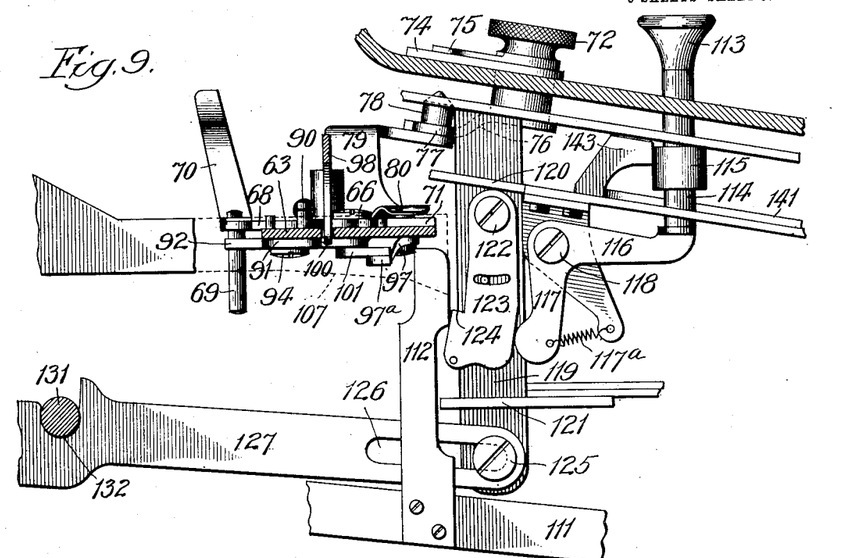
Figs. 9, 10, 11 and 12 are side elevations, on an enlarged scale, of the mechanism shown near the center of Fig. 1.
Figure 10:
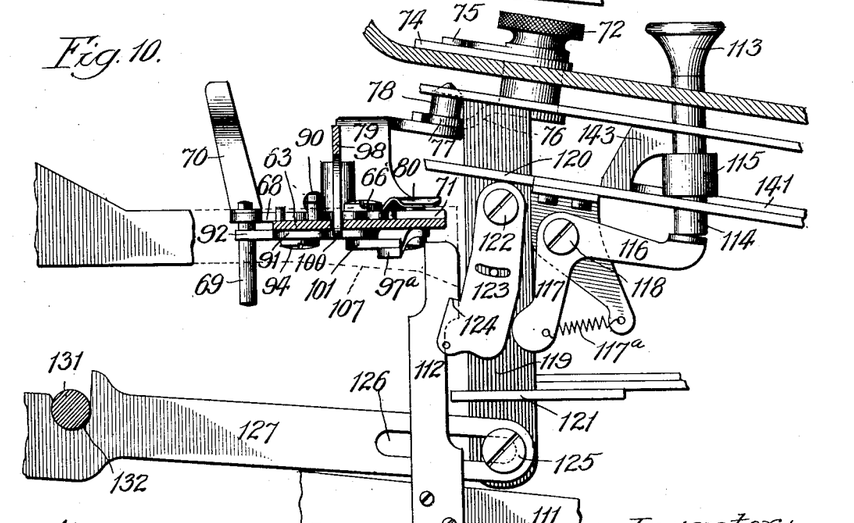
Figure 11:
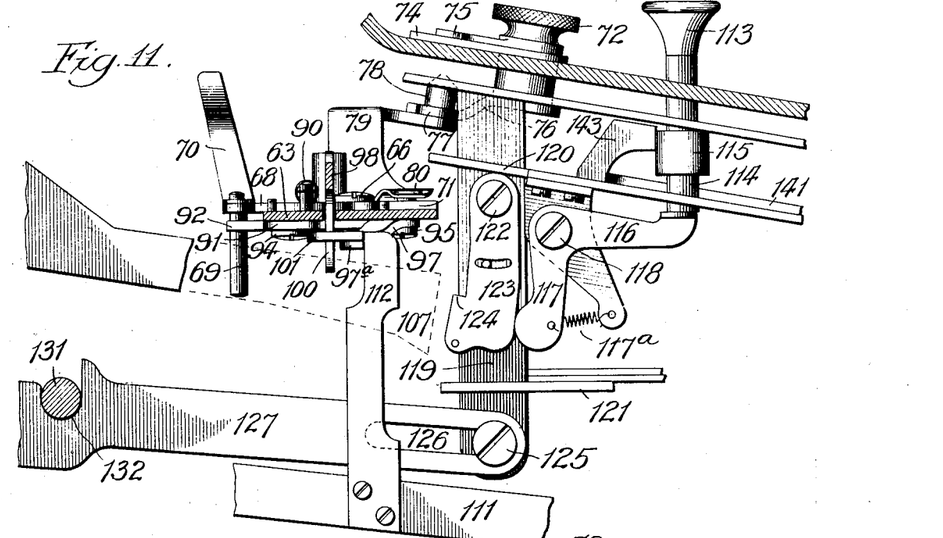
Figure 12:
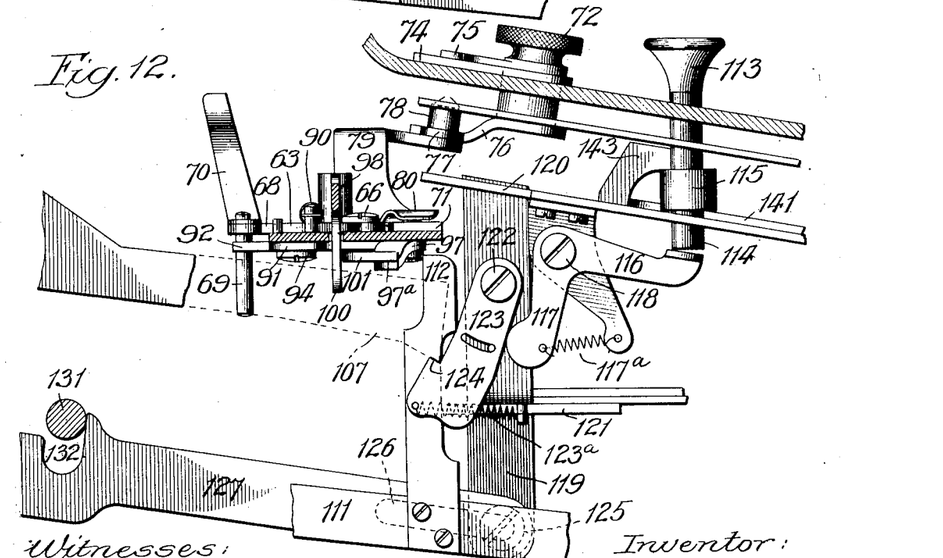

The reference numeral 113 designates the eliminating key. This is at the top of the vertical sliding shaft 114 which carries the collar 115 to limit its movement in either direction. See Figs. 9, 10, 11 and 12. A depression of the key 113 shifts the bell crank 116—117, pivoted at 118, from the position shown in Figs. 9 and 11 to that shown in Figs. 10 and 12. The vertical bar 119 is mounted to slide vertically in the frame members 120—121. It carries, pivoted at 122, a depending arm 123 adapted to swing in a front and rear direction. This depending arm 123 has a hook or shoulder 124 adapted to be engaged by the lower corner of the lever end 107. Thus when the eliminating key 113 is depressed the lever end 107 will catch the hook 124 and as said lever end moves down the slide 119 will be moved down. It is to be observed that the lever end 107 moves in an arc of a circle and as it falls, it retreats slightly from the vertical sliding bar 119. But the front edge of the depending arm 123 is so shaped that as the vertical slide 119 goes down the said arm 123 is pushed backward by the end 117 of the bell crank (see Fig. 12) and kept in engagement with the lever end 107. Referring to Fig. 1, the bar 141 is mounted to slide in a front and rear direction being held to the front by the spring 142. At its rear end it carries a hook 143 adapted to hook over the collar 115 and hold the eliminating key 113 down when it has been depressed. The front end 144 of the slide 141 is opposed to the end 146 of the pivoted lever 145. Whenever the operating handle is thrown, or whenever the total key is depressed, the lever 145 is thrown rearwardly. Thus either of said movements will disengage the hook 143 from the collar 115 and release the eliminating key.

The bottom end of the vertical slide 119 has a screw 125 which acts as a pivot to engage the slot 126 in the front end of the lever 127. A sector 128 (see Fig. 1) has a cam 129 in the upper part thereof engaging the stud 130. Normally the racks 23 do not engage the accumulator gears 27, but after the racks have been drawn forward by the forward throw of the operating handle the sector 128 is shifted forward the cam 129 lifts the stud 130 and thus lifts the racks into engagement with the accumulator gears 127. Then when the operating handle is returned to its initial position the sector 128 is returned to the position shown in Fig. 1 and disengages the racks 25 from the accumulator gears 27. There is a stud 131 on the sector 128 which is normally engaged by a notch 132 in the lever or link 127 that has been referred to. When the eliminating key 113 has been depressed and in consequence the lever end 107 has depressed the vertical slide 119, this disengages the notch 132 from the stud 131 and thus the movement of the link 127 does not shift the sector 128. The effect therefore of depressing the eliminating key is to permit the movement of the sliding bars 25 and to permit printing of the item set up by means of the keys 21, while preventing the accumulator mechanism from being affected by the eliminated item. It will be understood that the link 127 is thrust forward as the operating handle reaches the end of its forward throw, as the result of the action of an arm 218 carried by the main rock shaft 103, upon a radius link 219 to which said link 127 is connected as shown in Fig. 1; the latter being returned at the close of the operation by reason of the action of said arm 218 against another radius link 220 connected by a bar 221 with the first-mentioned radius link. It is desirable to print an eliminated item in a distinctive color. I will now proceed to describe the means by which this is accomplished. The ink ribbon 140 is made in three longitudinal strips of color, namely, black, green and red. In the normal operation of the machine the ribbon stands with the black portion over the type that are adapted to be struck by the hammers 29. When the shaft 103 rotates, as has been described the cam slot 151 rises and thus the arm 152 is raised. This arm 152 has a forked end, but it will be observed on referring to Fig. 1 that the lower fork clears the stud 136. However when the total key 108 is depressed the link 111 is shifted to the rear and a stud 153 thereon engaging the fork in the lower end of the lever 137 carries the stud 136 into the fork on the arm 152. Then when the operating handle is thrown and the arm 152 rises it raises the lever or link 137, rotates the bell crank 138, and by means of the connecting link 139 shifts the ribbon forward so that the red strip thereof is in position to print. Thus totals will be printed in red. A lever 133 is provided having a slot 134 engaging the stud 131. The rear end of this lever 133 is designated as 135, and as shown in Fig. 1, it is in position when it rises to strike under the stud 136 and lift the link 137. When the eliminating key 113 is depressed, and in consequence thereof the vertical slide 119 is depressed, this carries the screw 125 down and the forward end of the lever 133 being engaged by the said screw, this lever is rotated so that its end 135 lifts the stud 136 and thus the ribbon is shifted so that the intermediate green strip thereof is in position for printing.

In connection with the foregoing description of the structure of my improved adding machine, I have told how the various mechanisms described operate, so that it will now be necessary merely to describe the operation of the machine in a general way. When the two milled heads 50 and 72 are turned to the left so as to indicate zero, then my adding machine operates like those known in the prior art. The depression of any key 21 will cause zeros to be printed to the right of the corresponding digit in so far as other keys to the right are not depressed. By turning the milled head 50, two, three, four or five places on the left may be split off so that the depression of a key to the left will cause the zeros to be filled in only up to the split point and no farther. The depression of a key to the right of the split will, of course, cause zeros to be filled in from the digit corresponding to such key to the right thereof. By shifting the milled head 72, two, three, four or five of the racks 25 on the left of the machine may be permanently laterally disengaged from the corresponding accumulator gears 27 and thus the items set up to the left of the splitting point, although printed, are prevented from going into the accumulator. Nevertheless when the total key is depressed and the link 111 pushed back, its upright 112 pushing against the shoulder 97$^a$ of the lever 96—97 will cause the projections 92 to shove the rack bars 25 over into engagement with the corresponding accumulator gears 27. Thus if the items on the right have added up to make a sum with a number of digits greater than the number of places split off on the right and if in consequence the accumulator wheels on the left of the splitting point have had amounts carried into them from denominations of lower order, then by this reëngagement of the racks 25 with the accumulator gears, the total will be printed complete. In taking a total, the racks 25 move forward in engagement with the accumulator gears 27, and restore the said gears to zero position. Then the racks return to the rear out of engagement leaving the accumulator clear. To accomplish this the total key must be held down during the whole front and rear throw of the main operating handle. In taking a sub-total, the total key is held down only during the forward throw of the handle, that is, while the racks 25 are moved forward, and is then released. In consequence the racks 25 engage the accumulator wheels 27 on both the forward and rear travel of the racks 25. This operation is old in the prior art and is embodied in the Universal adding machine as now manufactured and sold. As has been explained, the depression of the total key 108 shifts the slide 91 and thus pushes the racks 25 into engagement with the accumulator gears 27. After the operating handle begins its throw the lever end 107 drops from under the depending tongue 102 and the depending tongue 100 drops in front of the hook 101 and holds the slide 97 in the position of engagement of the racks. Hence when the total key is released after the forward throw of the operating handle in taking a subtotal, the bell crank 96—97 is not released in consequence, but is held until the operating handle has completed its throw and the lever end 107 has raised the arm 98.

The spring tongues 70 pressing against the accumulator gears 27 act as brakes to prevent said gears from being rotated by accidental jars or from any cause except positive movement as by engagement with the racks 25 or by carrying from denominations of lower order. It will be observed that these spring tongues 70 press lightly against the accumulator gears 27 when the racks are in engagement therewith, but that they are moved over more firmly when the racks are shifted to the left.

It is generally desirable to set the pointers 54 and 75 at corresponding places on the respective scales 53 and 74, for this has the effect of splitting the printing mechanism and the accumulating mechanism at corresponding places. In the printing of a total after the machine has been operating with the printing mechanism and accumulating mechanism correspondingly split, it will be desirable to restore the pointer 54 to normal so that a cipher will be printed in event one should occur in the total amount just to the right of the point of split.

The operation of the eliminating mechanism will be sufficiently obvious in connection with the disclosure of its structure. It will be seen that the parts moved directly by the depression of the key 113 are very few and light, so that they afford little resistance. A depression of a key simply serves to cause a part (namely, the lever end 107), moved by the throw of the operating handle, to engage and move the parts which are necessary to be displaced in order to accomplish the elimination. Thus the labor is done mostly through the operating handle instead of through the key.

In the following claims I employ specific terms with the intention that they shall apply to equivalents. For example, I intend that the term "operating handle" shall cover any driving means, as a motor.

I claim:

1. In a machine of the character described, the combination with accumulating and printing devices, the former coöperatively related for additive carrying and the latter coöperatively related for cipher printing, and means for setting up a total by restoration of the accumulator to zero; of means for suspending coöperative action of printing devices at a predetermined location and preventing accumulation to one side of such location while permitting the additive carrying to take place beyond that location.

2. In a machine of the character described, the combination of accumulator wheels, actuators therefor, means determining the extent of movement of said actuators, carrying mechanism, devices for regulating the order of engagement and disengagement of wheels and actuators, type carriers moving with the actuators, printing hammers for the type, latches or triggers for said hammers coöperatively related for cipher printing purposes with a movable coupler between adjacent latches, and means for displaying said coupler and preventing accumulative action between wheels and actuators associated with latches to one side of the coupler, while preserving coöperative relation thereof for the carrying action.

3. In a machine of the character described, the combination of an accumulator having elements of various denominations, corresponding type carriers, means for differentially and denominationally operating the accumulator and correspondingly setting up type, totalizing mechanism adapted to coöperate with the accumulator to set up in type the total thereon, means for preventing numbers of predetermined denominations from being registered in the accumulator, and means for permitting the corresponding elements of the accumulator to participate in registering a total.

4. In a machine of the character described, the combination with accumulating and printing devices, the former coöperatively related for additive carrying and the latter coöperatively related for cipher printing, means for setting up a total by restoration of the accumulator to zero; of means for suspending coöperative action of printing devices at a predetermined location and preventing accumulation to one side of such location while permitting the additive carrying to take place beyond that location, type carriers between which and the accumulator coöperative action is suspended by the last-recited means to one side of such location, and means for causing resumption of coöperative action between the accumulator and type carriers to that side of said location as an incident to the adjustment for setting up a total.

5. In an adding machine, an accumulator having elements corresponding to numbers of different denominations, printing mechanism adapted to print numbers given to the accumulator and also to print totals taken therefrom so as to indicate their denominations, means for splitting the printing mechanism into two independent parts, means for splitting the accumulator in correspondence with the printing mechanism and for suppressing one part of the accumulator from taking numbers printed by the corresponding part of the printing mechanism, and means for causing the suppressed part of the accumulator mechanism to participate in giving a total to the printing mechanism.

6. In an adding machine, an accumulator having elements corresponding to numbers of different denominations, printing mechanism adapted to print numbers given to the accumulator and also to print totals taken therefrom so as to indicate their denominations, means for splitting the printing mechanism into two independent parts and means for splitting the accumulator in correspondence with the printing mechanism and for suppressing one part of the accumulator from taking numbers printed by the corresponding part of the printing mechanism.

7. In an adding machine, an accumulator with elements of various denominations, means differentially and denominationally actuating accumulator, means for preventing a plurality of the higher denomination elements of the accumulator from having numbers put into them by the aforesaid means, means whereby numbers may be put into the said higher elements of the accumulator by being carried from lower denomination elements, and means for printing a total including such carried numbers.

8. In an adding machine, an accumulator, printing mechanism, means for putting a number into a section of the accumulator, means for printing said number, and means for simultaneously printing another number excluded from the accumulator section normally capable of receiving it.

9. In an adding machine, a printing platen, means for printing thereon two numbers side by side in one position of the platen, means for accumulating all the numbers printed on one side, means for printing a total of all the numbers so accumulated, and means for carrying from denominations of lower order into the parts of the accumulator corresponding to the other side and printing numbers obtained by such carrying.

10. In an adding machine, printing mechanism adapted to print zeros automatically to the right of any significant digit, means for splitting the printing mechanism, means for accumulating the numbers on one side, means for taking a total of the accumulated numbers, and means for extending said total across into denominations corresponding to the other side.

11. In an adding machine, rack bars of various denominations, accumulator gears corresponding thereto, means for moving the bars, means for causing part of the moving bars to engage the corresponding accumulator gears, and means for preventing engagement between the balance of the moving bars and their accumulator gears.

12. In an adding machine, an accumulator, printing mechanism, movable elements adapted to produce corresponding effects in the accumulator and in the printing mechanism, and means to suspend coöperative relationship between certain ones of said movable elements and the accumulator while preserving coöperative relationship between them and the printing mechanism.

13. In an adding machine, an accumulator, printing mechanism, movable elements adapted to put numbers into the accumulator and to cause the printing mechanism to print the same numbers, and means to suspend coöperative relationship between certain ones of said movable elements and the accumulator while preserving coöperative relationship between them and the printing mechanism.

14. In an adding machine, an accumulator, movable elements adapted to put numbers into the accumulator and to take totals out of the accumulator, and means to suspend coöperative relationship between certain ones of said elements and the accumulator to put numbers therein while permitting the same elements to participate in taking a total from the accumulator.

15. In an adding machine, racks corresponding to numbers of different denominations, an accumulator with corresponding gears, and means for displacing certain ones of the racks so that they shall not engage their respective gears.

16. In an adding machine, racks corresponding to numbers of different denominations, an accumulator with corresponding gears means for simultaneously moving all the racks toward or from their respective gears, and means for displacing certain ones of the racks so that they shall not engage their respective gears.

17. In an adding machine, racks corresponding to numbers of different denominations, an accumulator with corresponding gears, means for displacing certain ones of the racks so that they shall not engage their respective gears, a total key, and means connecting the total key to the racks so that a depression of the total key shall restore the racks into position to engage the gears.

18. In an adding machine racks corresponding to numbers of different denominations, an accumulator with corresponding gears, means for throwing certain of the racks out of alinement with their respective gears, means whereby depression of the total key restores the racks to alinement with the gears, an operating handle, and means to lock the racks in their position of alinement during the throw of the operating handle.

19. In an adding machine, racks corresponding to numbers of different denominations, an accumulator with corresponding gears, and means for variably throwing the racks out of alinement with the gears.

20. In an adding machine, racks corresponding to numbers of different denominations, an accumulator with corresponding gears, means for variably throwing the racks out of alinement with the gears, a total key, and means whereby depression of the total key simultaneously restores the racks to alinement.

21. In an adding machine, bars corresponding to numbers of various denominations, springs acting on the respective bars so as to displace them laterally, members connected to the respective bars, and a movable plate with notches adapted to register successively with the said members and thus permit the said springs to successively displace the bars laterally.

22. In an adding machine, an accumulator having elements corresponding to numbers of various denominations and adapted to have numbers put into it and to have totals and subtotals taken out of it, and means for preventing numbers from going into certain elements of the accumulator while permitting totals and subtotals to be taken from the same elements of the accumulator.

23. In an adding machine a split printing device, a split accumulator, total-taking means, and means to restore the accumulator to nonsplit condition when taking a total therefrom.

24. In an adding machine, means whereby separate columns of figures can be printed simultaneously, a totalizer co-extensive with both columns, and means whereby the total of one column can be printed, the whole printing mechanism corresponding to both columns of figures being available for printing said total.

25. In an adding machine, printing hammers, triggers to hold said hammers, means to raise any trigger and thereby release the corresponding hammer, couplers on the respective triggers, each coupler being adapted to raise the adjacent trigger on one side when its own trigger is raised, and a member adapted to be placed near one of the couplers so as to displace it when the corresponding trigger is raised and thereby prevent the coupler from engaging the adjacent trigger.

26. In an adding machine, printing hammers, respective triggers to hold said hammers, a shoulder on each trigger, a lever on each trigger, one arm thereof projecting normally in front of the shoulder on the adjacent trigger at one side, and a member adapted to be shifted so as to stand near the other arm of any one of the levers so that when the corresponding trigger is raised the first mentioned end of the lever will be displaced from in front of the shoulder on the adjacent trigger.

27. In an adding machine, printing hammers, respective triggers to hold the hammers, a displaceable coupler on each trigger adapted in one position to raise the adjacent trigger at one side when the trigger carrying the coupler is raised, and a member adapted to be placed near any coupler and to engage it when its trigger is raised and thus shift the coupler so as not to engage the adjacent trigger.

28. In an adding machine, printing hammers, triggers therefor, a shoulder and a notch on each trigger, a pivoted coupler on each trigger having a part thereof normally opposite the shoulder of the adjacent trigger, and a member adapted to engage any coupler when its trigger is raised and shift the said part to a position opposite the said notch on the adjacent trigger.

29. In an adding machine, printing hammers, triggers therefor, a coupler on each trigger adapted to engage the adjacent trigger at one side, a longitudinally movable shaft lying beside all the couplers, and a collar on said shaft, the collar being adapted to be placed near any one of the couplers and shift the same to inoperative position when its trigger is raised.

30. In an adding machine, rack-bars, corresponding accumulator gears, a frame plate lying across the said rack bars, bell cranks pivoted on said plate and each having a fork at one end engaging a corresponding rack bar, a sliding plate mounted on the frame plate, notches on the edge of the sliding plate adapted to successively receive the remaining ends of the bell-cranks, and springs to shift the ends of the bell-cranks into the notches.

31. In an adding machine, rack bars, corresponding accumulator gears, a frame plate lying across the said rack bars, means on the frame plate for successively displacing the rack bars, a sliding plate having members adapted to restore the displaced rack-bars, a total key, means connecting the sliding plate to the total key whereby depression of the latter restores the rack bars, a latch adapted to hold the racks in restored position after the total key is released, an operating handle, and means connecting the operating handle to the said latch whereby it holds the racks when and only when the operating handle is displaced from its normal position.

32. In a machine of the class described, the combination with type-setting means, an accumulator, type-impressing means, means for controlling the accumulator and type-setting means for total printing, and means for eliminating accumulation, of polychrome means for causing the printing of accumulated items in one color, unaccumulated items in another color, and totals in a third color.

33. In an adding machine an operating handle, racks and accumulator gears normally out of engagement, means connecting the operating handle to the racks for shifting them into engagement with the gears, a members moved by the operating handle, an eliminating key, and connections whereby depression of said key causes said member to disconnect the operating handle from the rack shifting means when the operating handle is actuated.

34. In an adding machine, an operating handle, an accumulator with driving mechanism extending thereto from said handle, a member adapted to be moved by the throw of said handle, and an eliminating key adapted to connect said member to said driving mechanism, so that when the operating handle is thrown the member will disconnect the mechanism and the accumulator will not be actuated.

35. In an adding machine, an operating handle, a printing mechanism, a ribbon shifting carriage, two different trains of mechanism adapted to connect the operating handle and said carriage, a total key adapted to connect one of said trains and an eliminating key adapted to connect the other of said trains.

36. In an adding machine an operating handle, accumulating mechanism, a printing mechanism, a ribbon shifting carriage adapted to be connected to the operating handle, and an eliminating key adapted to establish such connection and to disable the accumulating mechanism.

37. In an adding machine, an operating handle, a printing mechanism, a ribbon shifting carriage, a lever that oscillates once whenever the operating handle is thrown, another lever adapted when oscillated to shift the ribbon shifting carriage, and an eliminating key adapted to cause the first lever to engage the second lever, whereby the ribbon will be shifted when the operating handle is thrown.

38. In an adding machine, rack bars and corresponding accumulator gears, a member adapted to engage the racks with the gears or disengage theme therefrom, a stud on said member, an actuating link with a notch engaging said stud, an operating handle, a lever adapted to be oscillated once by the throw of the operating handle, and an eliminating key adapted to cause the said lever to engage the said link, whereby a throw of the operating handle will disengage the notch on the link from the aforesaid stud.

39. In an adding machine, an operating handle, mechanism driven thereby, a movable member carrying a hook, an eliminating key adapted to push the said hook into engagement with said mechanism, an accumulator connected to be actuated by the operating handle, and means attached to the said movable member for breaking the connection between the operating handle and the accumulator when the movable member is displaced by the said mechanism.

FRANK C. RINSCHE.

Witnesses:
EDWARD SCHMID,
JOS. M. CONNOR.

Copies of this patent may be obtained for five cents each, by addressing the "Commissioner of Patents, Washington, D. C."